3,819,613
ADENOSINE DERIVATIVES AND THE
PRODUCTION THEREOF
Ryuji Marumoto, Minoo, Yoshio Yoshioka, Higashiyodo-
gawa, Katsuyoshi Kawazoe, Suita, and Mikio Honjo,
Takatsuki, Japan, assignors to Takeda Chemical In-
dustries, Ltd., Osaka, Japan
No Drawing. Filed Dec. 22, 1971, Ser. No. 211,107
Claims priority, application Japan, Dec. 28, 1970,
46/124,064
Int. Cl. C07d 51/54
U.S. Cl. 260—211.5 R                     11 Claims

ABSTRACT OF THE DISCLOSURE

Compounds of the formula

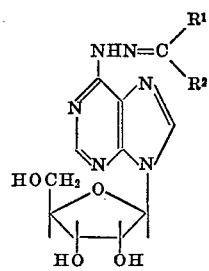

are disclosed wherein $R^1$ is hydrogen or lower alkyl and $R^2$ is a hydrocarbon residue or a heterocyclic, each of which may be optionally substituted, or $R^1$ and $R^2$ taken together with the adjoining carbon atom constitute indanidene or N-methylbenzothiazolidene. These compounds are useful as hypotensive agents.

---

The present invention relates to novel and useful adenosine derivatives, and to a method for producing these compounds.

It has been known that adenosine has a hypotensive action as well as a coronary dilating action. However, this compound cannot be clinically used because of its rapid decomposition in blood.

The present inventors have succeeded in producing a novel type of adenosine derivatives, i.e. those of the formula:

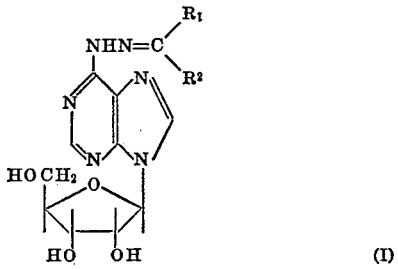

wherein $R^1$ is a hydrogen atom or a lower alkyl group having up to 8 carbon atoms, and $R^2$ is a hydrocarbon residue having up to 10 carbon atoms, for example, phenyl, naphthyl, and the like; a heterocyclic such as furyl, thienyl or pyridyl, each member of which may have one or more of substituents such as hydroxy, lower alkyl having up to 3 carbon atoms, lower alkoxy having up to 2 carbon atoms, dialkylamino having up to 4 carbon atoms, lower alkoxycarbonyl having up to 3 carbon atoms and hydroxyalkyl having up to 3 carbon atoms; or $R^1$ and $R^2$, taken together with the adjoining carbon atom, constitute indanidene or N-methylbenzothiazolidene.

Referring to the formula (I), the lower alkyl for $R^1$ is exemplified by methyl, ethyl, butyl, isobutyl, pentyl, allyl and octyl; the hydrocarbon residue is exemplified by an alkyl (e.g. methyl, butyl, isobutyl, allyl, octyl, decyl), an aryl (e.g. phenyl, naphthyl) and an aralkyl (e.g. benzyl, phenethyl, styryl); and the hydrocarbon residue, furyl, thienyl and pyridyl may have a substituent or substituents, i.e. hydroxy, lower alkyls (e.g. methyl, propyl), lower alkoxys (e.g. methoxy, ethoxy), dialkylaminos (e.g. dimethylamino, diethylamino), lower alkoxycarbonyls (e.g. methoxycarbonyl, ethoxycarbonyl) and/or hydroxyalkyls (e.g. hydroxymethyl, hydroxyethyl).

Further studies on these compounds (I) have revealed that they exhibit excellent pharmacological actions such as a strong and prolonged hypotensive and coronary dilating action.

Thus, the principal object of the present invention is to provide the novel adenosine derivatives (I) having the strong and long-lasting hypotensive action as well as coronary dilating action.

Another object of the present invention is to provide a pharmaceutical composition comprising one or more of the said adenosine derivatives (I).

A further object of the present invention is to provide a method for the production of the novel and useful adenosine derivatives (I).

The adenosine derivative (I) is produced by reacting a nebularine derivative of the formula

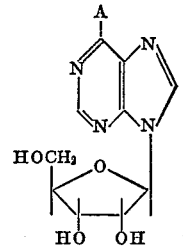

with a compound of the formula

wherein $R^1$ and $R^2$ are as precedingly defined and B stands for hydrazono group or oxygen atom.

When B is hydrazono group, A is an active radical which can be substituted by the group

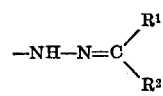

at 6 position of the nebularine derivative (II) by the reaction with the terminal amino group of the hydrazone (III). The said active radical is exemplified by a halogen such as chlorine, bromine, fluorine, or a radical represented by the formulae —$SR^3$ or —$SO_2R^3$ wherein $R^3$ stands for hydrogen atom, a lower alkyl having up to 8 carbon atoms such as methyl, ethyl, propyl, isobutyl, octyl or an aralkyl having up to 10 carbon atoms such as benzyl, phenethyl. The reaction in this case is represented by the following Reaction Schema IV:

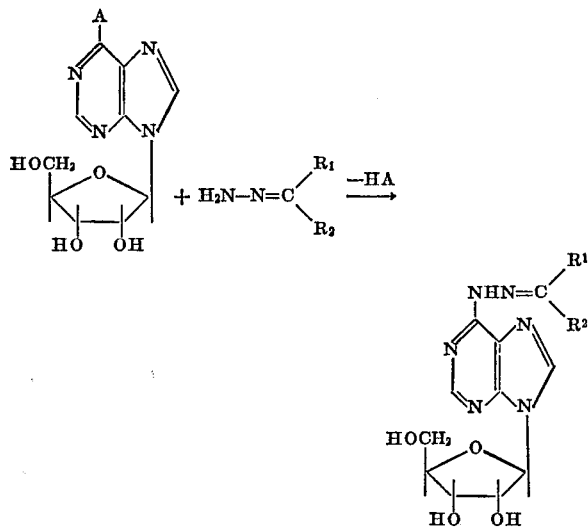

wherein $R^1$ and $R^2$ are as precedingly defined and A is the active radical.

When B is oxygen atom, A is hydrazino group. The reaction in this case is represented by the following Reaction Schema V:

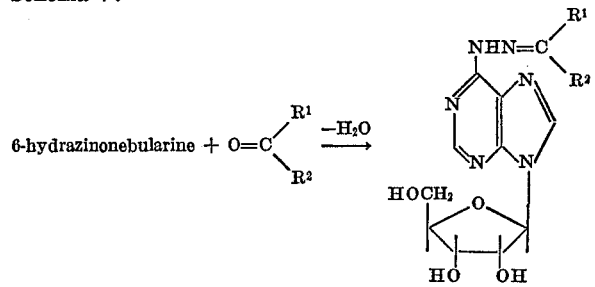

The nebularine derivatives (II) are known compounds and can be easily prepared by a *per se* established method.

The compounds (III) are also known and can be prepared by *per se* known methods. More particularly, the compounds (III) wherein B is oxygen atoms are aldehydes or ketones and the compounds (III) wherein B is hydrazono group are hydrazones prepared by reacting those aldehydes or ketones with hydrazine ($NH_2NH_2$).

To produce the adenosine derivatives (I) wherein $R^2$ is a lower alkyl in a high yield, the reaction represented by Reaction Schema V is recommended.

Both the compounds (II) and (III) may be optionally employed in the form of their salt and illustratively an inorganic acid e.g. corresponding hydrochloride or sulfate depending on the types of A, B, $R^1$, and $R^2$.

Both the reactions represented by the Reaction Schemata IV and V are carried out in the presence or in the absence of a solvent. As the solvent, an organic solvent such as methanol, ethanol, 2-methoxyethanol or a mixture thereof is advantageously employed. Generally, the reactions proceeds smoothly at room temperature or on heating. Advantageously, the reactions are conducted at elevated temperatures from about 60° to about 150° C.

Thus-produced adenosine derivatives (I) can be easily recovered from the reaction mixture as the free base or in the form of a pharmaceutically acceptable salt e.g. hydrochloride. For example, the reaction mixture is concentrated to dryness and the resulting residue is recrystallized from a suitable solvent e.g. water to give the desired end product.

The novel adenosine derivatives (I) of the present invention are characterized by their strong and long-testing hypotensive action as well as coronary dilating action, and may be used as hypotensive and/or coronary dilating agents for mammals.

The following is an example of the test in which the hypotensive action of illustrative compounds of the present invention is demonstrated.

Test for hypotensive action

Cats weighing 2.0–4.0 kg. were anesthetized with α-chloralose (intravenous administration of 40 mg./kg.) and ethyl carbamate (intravenous administration of 250 mg./kg. plus intraperitoneal administration of 250 mg./kg.). Each animal was cannulated with a tracheal tube and blood pressure change of carotid artery was recorded on polygraph employing a pressure transducer. Each test compound was injected at the dose of 10 μg./kg. into femoral vein of the animals in the form of a 0.1 mg./ml. solution in a mixture of water and polyethylene glycol (Polyethylene glycol 400) in a volume ratio of about 19:1 to 9:1.

The results are summarized in Table 1.

In Table 1 as well as in Examples described hereinafter, "9-β-D-ribofuranosylpurin-6-yl" is briefly referred to as "nebularinyl."

TABLE 1

| Test compound | Blood pressure before administration (mm. Hg) | Decrease of blood pressure (percent) | | |
|---|---|---|---|---|
| | | 1-1.5 minutes after administration | 5 minutes after administration | 10 minutes after administration |
| Control 1 (adenosine) | 135 | 0 | 0 | 0 |
| Control 2 (the solvent at the dose of 0.1 mg./kg.) | 138 | 0 | 0 | 0 |
| Benzaldehyde nebularinylhydrazone | 140 | −21 | −1 | 0 |
| Vanillin nebularinylhydrazone | 140 | −24 | −11 | −4 |
| 2-furaldehyde nebularinylhydrazone | 140 | −23 | −6 | −2 |
| 3,5-dimethoxy-4-hydroxybenzaldehyde nebularinylhydrazone | 138 | −31 | −18 | −11 |
| 3-hydroxy-4-methoxybenzaldehyde nebularinylhydrazone | 142 | −19 | −11 | −9 |
| 3,4-dimethoxybenzaldehyde nebularinylhydrazone | 138 | −18 | −7 | −5 |
| 3,5-dimethoxybenzaldehyde nebularinylhydrazone | 140 | −19 | −4 | −4 |
| 4-methyloxycarbonylbenzaldehyde nebularinylhydrazone | 138 | −15 | −3 | 0 |
| 4-dimethylaminobenzaldehyde nebularinylhydrazone | 135 | −5 | −2 | 0 |

The adenosine derivatives (I) may be administered alone or in combination with a pharmaceutically acceptable carrier or carriers. They are administrable in the forms of powders, tablets, solutions or emulsions for oral administration, or in the form of injectable liquid.

Pharmaceutical compositions containing one or more of the adenosine derivatives can be prepared by *per se* conventional methods for the preparation of powder, capsules, tablets, pills, injections and the like. The choice of carriers may be determined depending upon the route of administration, the solubility of the adenosine derivatives (I) and so on.

The dose of the adenosine derivatives (I) may be chosen depending upon the route of administration, the species of mammals and purpose of administration. For instance, when the adenosine derivatives (I) are orally administered to a human adult for the purpose of treating coronary insufficiency or essential hypertension, advantageous doses are in a range from 0.1 mg. to 20 mg. per day.

The following Examples are intended merely to illustrate presently preferred embodiments of the present invention and not to restrict the scope of this invention.

Throughout the foregoing description as well as in the following Examples and Claims, "µg.," "mg.," "kg.," "ml." and "° C." respectively refer to "microgram(s)," "milligram(s)," "kilogram(s)," "milliliter(s)" and "degrees centigrade." In Examples, the relationship between parts by weight and parts by volume corresponds to that between grams and milliliters.

EXAMPLE 1

To a solution of 0.5 part by weight of 6-hydrazinonebularine in 20 parts by volume of 2-methoxyethanol is added 0.5 part by volume of benzaldehyde, and the resulting mixture is heated at 100° C. for 1 hour. The mixture is concentrated under reduced pressure to give needles. The needles are recovered by centrifugation and dissolved into 10 parts by volume of dimethylformamide. After the addition of 100 parts by volume of water, the mixture is kept standing at a room temperature for 20 hours to yield 0.4 part by weight of benzaldehyde nebularinylhydrazone as needles. Melting point: 190°–191° C.

*Elementary analysis.*—Calculated for $C_{17}H_{18}N_6O_4 \cdot H_2O$ (percent): C, 52.57; H, 5.19; N, 21.64. Found (percent): C, 52.82; H, 4.83; N, 21.52.

EXAMPLE 2

To a solution of 0.8 part by weight of 6-chloronebularine in 20 parts by volume of 2-methoxyethanol is added 1.7 part by weight of N-methylbenzothiazolone hydrazone. The mixture is heated at 120° C. for 3 hours and then evaporated to dryness under reduced pressure. The resulting residue is dissolved into 10 parts by volume of a mixture of chloroform and methanol (19:1 by volume) and the solution is allowed to pass through a column packed with 100 parts by weight of silica gel. The column is subjected to elution with 800 parts by volume of the same mixture to obtain a fraction containing the objective compound. The fraction is evaporated to dryness under reduced pressure and the resulting residue is recrystallized from methanol to yield 0.5 part by weight of N-methylbenzothiazolone nebularinylhydrazone as yellowish crystals. Melting point: 190°–192° C.

*Elementary analysis.*—Calculated for $C_{18}H_{19}N_7O_4S$ (percent): C, 50.33; H, 4.46; N, 22.83; S, 7.46. Found (percent): C, 49.79; H, 4.34; N, 22.96; S, 7.64.

EXAMPLE 3

A mixture of 6 parts by weight of hydrazinonebularine 1.5 part by volume of acetone and 400 parts by volume of 2-methoxyethanol is treated after the manner described in Example 1 to give 6 parts by weight of crystals of acetone nebularinylhydrazone. Melting point: 125°–130° C.

*Elementary analysis.*—Calculated for $C_{13}H_{18}N_6O_4$ (percent): C, 48.44; H, 5.63; N, 26.08. Found (percent): C, 48.34; H, 5.52; N, 25.85.

EXAMPLE 4

A mixture of 3 parts by weight of 6-chloronebularine, 50 parts by volume of 2-methoxyethanol and 2 parts by volume of acetone hydrazone is heated at 60° C. for 4 hours. The reaction mixture is evaporated to dryness and the resulting residue is recrystallized from ethanol to give 2.6 parts by weight of acetone nebularinylhydrazone. Melting point: 125°–130° C.

EXAMPLE 5

A mixture of 1 part by weight of 6-methylthionebularine, 20 parts by volume of 2-methoxyethanol and 1.8 part by weight of N-methylbenzothiazolone hydrazone is treated after the manner described in Example 2, followed by the treatment described in the same to give 0.65 part by weight of crystals of N-methylbenzothiazolone nebularinylhydrazone. Melting point: 191°–193° C.

EXAMPLE 6

A mixture of 4 parts by weight of 6-methylsulfonylnebularine, 200 parts by volume of 2-methoxyethanol and 9 parts by weight of N-methylbenzothiazolone hydrazone is treated after the manner described in Example 2 to give 3 parts by weight of crystals of N-methylbenzothiazolone nebularinylhydrazone. Melting point: 190°–192° C.

EXAMPLE 7

A mixture of 8.5 parts by weight of 6-hydrazinonebularine, 30 parts by volume of 2-methoxyethanol and 6.1 parts by weight of pyridoxal hydrochloride is heated at 100° C. for 1 hour to give precipitates. The precipitates are recovered by filtration from the reaction mixture, washed with a small amount of ethanol and then recrystallized from 300 parts by volume of 10% water-containing methanol to give 12 parts by weight of pyridoxal nebularinylhydrazone hydrochloride as yellowish needles. Melting point: 242° C.

*Elementary analysis.*—Calculated for $$C_{18}H_{21}N_7O_6 \cdot HCl \cdot 1\tfrac{1}{2}H_2O$$

(percent): C, 43.70; H, 5.07; N, 19.82; Cl, 7.17. Found (percent): C, 43.25; H, 4.53; N, 19.12; Cl, 7.19.

EXAMPLE 8

The reactions represented by Reaction Schemata IV and V are repeated in the same procedures as in the preceding Examples to give the compounds listed in Table 2, which are all novel and useful and fall within the scope of the formula (I):

TABLE 2

| Compounds | | Melting point (° C.) | Molecular formula [1] |
|---|---|---|---|
| $R^1$ | $R^2$ | | |
| H |  | 160–165 | $C_{21}H_{20}N_6O_4 \cdot H_2O$ |
| H |  | 164–165 | $C_{18}H_{20}N_6O_5 \cdot H_2O$ |
| H | 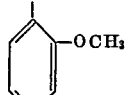 | 168–171 | $C_{18}H_{20}N_6O_5 \cdot H_2O$ |
| H | 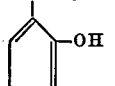 | 188–190 | $C_{19}H_{22}O_6N_6 \cdot H_2O$ |
| H | 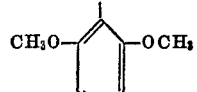 | 178–180 | $C_{19}H_{23}N_7O_4 \cdot H_2O$ |
| H | 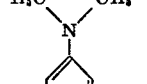 | 162–163 | $C_{21}H_{27}N_7O_4 \cdot H_2O$ |

See footnotes at end of table.

TABLE 2—Continued

| Compounds R¹ | Compounds R² | Melting point (°C.) | Molecular formula [1] |
|---|---|---|---|
| H | H₃C–CH–CH₃ attached to phenyl | 150–152 | $C_{20}H_{24}N_6O_4 \cdot H_2O$ |
| H | phenyl–COOCH₃ | 210–211 | $C_{19}H_{20}N_6O_6 \cdot H_2O$ |
| H | phenyl with OCH₃, –OCH₃ | 140–143 | $C_{19}H_{22}N_6O_6 \cdot 3/2 H_2O$ |
| H | phenyl with OCH₃, –OCH₃ | 186–187 | $C_{19}H_{22}N_6O_6 \cdot 3/2 H_2O$ |
| H | H₃CO–phenyl–OCH₃ | 190–192 | $C_{19}H_{22}N_6O_6 \cdot 3/2 H_2O$ |
| H | phenyl with –OCH₃, –OCH₃ | 193–194 | $C_{19}H_{22}N_6O_6 \cdot 3/2 H_2O$ |
| H | H₃CO–phenyl–OCH₃ | 164–166 | $C_{19}H_{22}N_6O_6 \cdot 3/2 H_2O$ |
| H | phenyl with OC₂H₅, –OC₂H₅ | 148–155 | $C_{21}H_{26}N_6O_6 \cdot 3/2 H_2O$ |
| H | furyl | 130–135 | $C_{15}H_{16}N_6O_5 \cdot H_2O$ |
| H | thienyl | 154 | $C_{15}H_{16}N_6SO_4 \cdot H_2O$ |
| H | pyridyl | 263–5 | $C_{16}H_{17}N_7O_4 \cdot \frac{1}{2}H_2O$ |
| CH₃ | phenyl | 227 | $C_{18}H_{20}N_6O_4 \cdot \frac{1}{2}H_2O$ |
| CH₃ | naphthyl | (²) | $C_{22}H_{22}N_6O_4$ |
| H | phenyl–CH₂– | (³) | $C_{18}H_{20}N_6O_4$ |
| H | phenyl–CH=CH– | 231 | $C_{19}H_{20}N_6O_4$ |
| CH₃ | H₅C₂OCOCH₂– | 184 | $C_{14}H_{16}N_6O_5$ |
| | indanylidene | 248 | $C_{19}H_{20}N_6O_4 \cdot H_2O$ |

[1] The results of elementary analysis with regard to all the compound are in accord with the respective molecular formulae.
[2] Amorphous. Light yellowish powder. Its specific rotation is $[\alpha]_D^{23} = -49.5°$ (C=0.5, ethanol).
[3] Amorphous. Light yellowish powder. Its specific rotation is $[\alpha]_D^{23} = -56.4°$ (C=0.5, ethanol).

We claim:
1. An adenosine derivative of the formula

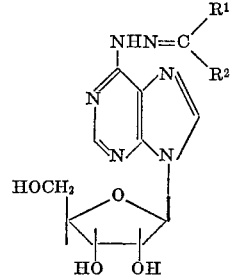

wherein R¹ is hydrogen or lower alkyl having up to 8 carbon atoms; R² is a member selected from the group consisting of alkyl having 1 to 10 carbon atoms, aryl having 6 to 10 carbon atoms, aralkyl in which aryl and alkyl are as defined, furyl, thienyl and pyridyl, each member of which may have at least one substituent selected from the group consisting of hydroxy, lower alkyl having up to 3 carbon atoms, lower alkoxy having up to 2 carbon atoms, dialkylamino having up to 4 carbon atoms, lower alkoxycarbonyl having up to 3 carbon atoms and hydroxyalkyl having up to 3 carbon atoms; or R¹ and R², when taken together with the adjoining carbon atom, constitute a member selected from the group consisting of indanidene and N-methylbenzothiazolidene, and pharmaceutically acceptable salts thereof.

2. An adenosine derivative according to claim 1, wherein the pharmaceutically acceptable salt is the hydrochloride or sulfate.

3. An adenosine derivative according to claim 1, wherein R¹ is a hydrogen atom.

4. An adenosine derivative according to claim 1, wherein R¹ is hydrogen and R² is alkyl having 1 to 10 carbon atoms, aryl having 6 to 10 carbon atoms, aralkyl in which aryl and alkyl are as defined.

5. An adenosine derivative according to claim 4, wherein R² is aryl having 6 to 10 carbon atoms or substituted aryl having a substituent selected from the group consisting of hydroxy, lower alkyl having up to 3 carbon atoms, lower alkoxy having up to 2 carbon atoms, dialkylamino having up to 4 carbon atoms, lower alkoxy carbonyl having up to 3 carbon atoms, and hydroxy alkyl having up to carbon atoms.

6. An adenosine derivative according to claim 1, wherein $R^1$ is hydrogen and $R^2$ is pyridyl or substituted pyridyl having a substituent selected from the group consisting of hydroxy, lower alkyl having up to 3 carbon atoms, lower alkoxy having up to 2 carbon atoms, dialkylamino having up to 4 carbon atoms, lower alkoxy carbonyl having up to 3 carbon atoms and hydroxy alkyl having up to 3 carbon atoms.

7. An adenosine derivative according to claim 1, which is benzaldehyde nebularinylhydrazone.

8. An adenosine derivative according to claim 1, which is N-methylbenzothiazolone nebularinylhydrazone.

9. An adenosine derivative according to claim 1, which is 3,5-dimethoxy-4-hydroxybenzaldehyde nebularinylhydrazone.

10. An adenosine derivative according to claim 1, which is vanillin nebularinylhydrazone.

11. An adenosine derivative according to claim 1, which is 3-hydroxy-4-methoxybenzaldehyde nebularinylhydrazone.

References Cited

UNITED STATES PATENTS

| 3,506,643 | 4/1970 | Thiel et al. | 260—211.5 R |
| 3,551,409 | 12/1970 | Kampe et al. | 260—211.5 R |
| 3,706,728 | 12/1972 | Fauland et al. | 260—211.5 R |

OTHER REFERENCES

Pigman, "The Carbohydrates," Academic Press Inc., New York, N.Y., 1957, pp. 415–416, 447–449 and 452–453.

JOHNNIE R. BROWN, Primary Examiner

U.S. Cl. X.R.

424—180

UNITED STATES PATENT OFFICE
CERTIFICATE OF CORRECTION

Patent No. 3,819,613          Dated June 25, 1974

Inventor(s) Ryuji Marumoto, et al

It is certified that error appears in the above-identified patent and that said Letters Patent are hereby corrected as shown below:

Column 8, line 21 : change "compound" to --compounds-- line 74: after "up" insert --to 3--.

Signed and sealed this 29th day of October 1974.

(SEAL)
Attest:

McCOY M. GIBSON JR.
Attesting Officer

C. MARSHALL DANN
Commissioner of Patents